(12) United States Patent
Champagne et al.

(10) Patent No.: US 9,676,409 B2
(45) Date of Patent: Jun. 13, 2017

(54) ROAD WHEEL DISTURBANCE REJECTION BASED ON HAND WHEEL ACCELERATION

(71) Applicants: Anthony J. Champagne, Saginaw, MI (US); Tejas M. Varunjikar, Saginaw, MI (US); Jens Dittmer, Muelheim an der Ruhr (DE)

(72) Inventors: Anthony J. Champagne, Saginaw, MI (US); Tejas M. Varunjikar, Saginaw, MI (US); Jens Dittmer, Muelheim an der Ruhr (DE)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 189 days.

(21) Appl. No.: 13/792,897

(22) Filed: Mar. 11, 2013

(65) Prior Publication Data

US 2014/0257641 A1    Sep. 11, 2014

(51) Int. Cl.
  *B62D 6/00*   (2006.01)
  *B62D 5/04*   (2006.01)

(52) U.S. Cl.
  CPC .................. *B62D 5/0472* (2013.01)

(58) Field of Classification Search
  CPC ........ B62D 6/008; B62D 5/0472; B62D 6/08; B62D 6/02; B62D 6/04; B62D 6/007; B60W 10/20; B60W 30/045
  USPC ...................................... 701/41–42
  See application file for complete search history.

(56) References Cited

U.S. PATENT DOCUMENTS

| | | |
|---|---|---|
| 4,874,053 A | 10/1989 | Kimura et al. |
| 5,029,466 A | 7/1991 | Nishihara et al. |
| 5,473,539 A | 12/1995 | Shimizu et al. |
| 5,482,129 A | 1/1996 | Shimizu |
| 5,709,281 A | 1/1998 | Sherwin et al. |
| 5,919,241 A | 7/1999 | Bolourchi et al. |
| 5,927,421 A | 7/1999 | Fukada |
| 5,948,030 A | 9/1999 | Miller et al. |
| 5,992,557 A | 11/1999 | Nakamura et al. |
| 6,032,091 A | 2/2000 | Noro et al. |
| 6,152,254 A | 11/2000 | Phillips |
| 6,223,852 B1 | 5/2001 | Mukai et al. |

(Continued)

FOREIGN PATENT DOCUMENTS

| | | |
|---|---|---|
| CN | 100999223 A | 7/2007 |
| CN | 100999223 B | 7/2007 |

(Continued)

OTHER PUBLICATIONS

European Search Report for EP App. No. 12192967.3, dated Apr. 2, 2013.

(Continued)

*Primary Examiner* — Nga X Nguyen
(74) *Attorney, Agent, or Firm* — Cantor Colburn LLP

(57) ABSTRACT

A control system for a steering system is provided, and includes an acceleration module, a scaling module, and a final command module. The acceleration module determines a hand wheel acceleration. The scaling module determines a rejection command. The rejection command is based on the hand wheel acceleration and a road wheel frequency. The final command module determines an adjusted assist command that is based on a normal assist command and the rejection command.

15 Claims, 7 Drawing Sheets

(56) References Cited

U.S. PATENT DOCUMENTS

| | | |
|---|---|---|
| 6,250,419 B1 | 6/2001 | Chabaan et al. |
| 6,298,941 B1 | 10/2001 | Spadafora |
| 6,370,459 B1 | 4/2002 | Phillips |
| 6,425,454 B1 | 7/2002 | Chabaan et al. |
| 6,588,541 B2 | 7/2003 | Norman et al. |
| 6,742,620 B2 | 6/2004 | Eidam et al. |
| 6,959,970 B2 | 11/2005 | Tseng |
| 7,040,450 B2 | 5/2006 | Nagase et al. |
| 7,558,661 B2 | 7/2009 | Sundaram et al. |
| 7,596,441 B2 | 9/2009 | Yokota et al. |
| 7,885,750 B2 | 2/2011 | Lu |
| 7,954,593 B2 | 6/2011 | Dornhege et al. |
| 7,974,754 B2 | 7/2011 | Nakatsu |
| 7,975,801 B2 | 7/2011 | Tashiro |
| 8,010,252 B2 | 8/2011 | Getman et al. |
| 8,108,105 B2 | 1/2012 | Saruwatari et al. |
| 8,165,770 B2 | 4/2012 | Getman et al. |
| 8,175,771 B2 | 5/2012 | Ukai et al. |
| 8,219,283 B2 | 7/2012 | Recker et al. |
| 8,548,667 B2 | 10/2013 | Kaufmann et al. |
| 8,666,605 B2 | 3/2014 | Delarche et al. |
| 8,666,607 B2 | 3/2014 | Kojo |
| 8,798,864 B2 | 8/2014 | Champagne et al. |
| 8,825,301 B2 | 9/2014 | Sugawara et al. |
| 8,843,276 B2 | 9/2014 | Kojo et al. |
| 8,903,606 B2 * | 12/2014 | Kleinau et al. ............... 701/41 |
| 8,977,433 B2 | 3/2015 | Kojima |
| 8,977,437 B2 | 3/2015 | Tamaizumi et al. |
| 9,327,761 B2 | 5/2016 | Tsubaki |
| 9,545,945 B2 | 1/2017 | Akatsuka et al. |
| 2002/0092696 A1 | 7/2002 | Bohner et al. |
| 2002/0179362 A1 | 12/2002 | Norman et al. |
| 2003/0074120 A1 | 4/2003 | Kleinau |
| 2004/0024505 A1 | 2/2004 | Salib et al. |
| 2004/0055810 A1 | 3/2004 | Rakan |
| 2004/0099469 A1 | 5/2004 | Koibuchi et al. |
| 2004/0117088 A1 | 6/2004 | Dilger |
| 2004/0262063 A1 | 12/2004 | Kaufmann et al. |
| 2005/0189163 A1 | 9/2005 | Barton et al. |
| 2005/0206224 A1 | 9/2005 | Lu |
| 2005/0206229 A1 | 9/2005 | Lu et al. |
| 2005/0246085 A1 | 11/2005 | Salib et al. |
| 2007/0299580 A1 | 12/2007 | Lin |
| 2008/0147276 A1 * | 6/2008 | Pattok ............... B62D 6/04 701/42 |
| 2009/0024281 A1 | 1/2009 | Hwang et al. |
| 2009/0105907 A1 | 4/2009 | Yamaguchi et al. |
| 2009/0125186 A1 | 5/2009 | Recker et al. |
| 2009/0143938 A1 | 6/2009 | Nishimura |
| 2009/0292421 A1 * | 11/2009 | Williams et al. ............... 701/42 |
| 2009/0294206 A1 | 12/2009 | Oblizajek et al. |
| 2010/0100283 A1 | 4/2010 | Hales et al. |
| 2010/0286869 A1 | 11/2010 | Katch et al. |
| 2011/0022272 A1 | 1/2011 | Hung et al. |
| 2011/0218706 A1 | 9/2011 | Mori et al. |
| 2012/0261209 A1 | 10/2012 | Shiino |
| 2013/0024072 A1 | 1/2013 | Michelis et al. |
| 2013/0073146 A1 * | 3/2013 | Konomi et al. ............... 701/41 |
| 2013/0151066 A1 | 6/2013 | Koukes et al. |
| 2013/0261894 A1 | 10/2013 | Kojima |
| 2014/0005894 A1 | 1/2014 | Aoki |
| 2014/0324294 A1 | 10/2014 | Champagne |
| 2015/0191200 A1 | 7/2015 | Tsubaki et al. |

FOREIGN PATENT DOCUMENTS

| | | |
|---|---|---|
| CN | 101734277 A | 6/2010 |
| CN | 102806942 A | 12/2012 |
| CN | 102917939 A | 2/2013 |
| CN | 102556152 B | 7/2013 |
| DE | 19634728 C1 | 4/1998 |
| DE | 10344279 A1 | 4/2004 |
| DE | 102008051552 A1 | 4/2009 |
| DE | 102008036001 A1 | 2/2010 |
| EP | 0353995 A2 | 2/1990 |
| EP | 1508495 A2 | 2/2005 |
| EP | 1623907 A1 | 2/2006 |
| EP | 1995150 A2 | 11/2008 |
| EP | 2028080 A1 | 2/2009 |
| EP | 1808359 B1 | 4/2009 |
| EP | 2184218 A2 | 5/2010 |
| EP | 2275323 A1 | 1/2011 |
| EP | 2223838 B1 | 11/2011 |
| EP | 2492168 A1 | 8/2012 |
| EP | 2497698 A1 | 9/2012 |
| GB | 2454788 A | 5/2009 |
| JP | 2001106099 A | 4/2001 |
| JP | 2003002222 | 1/2003 |
| JP | 3712876 B2 | 11/2005 |
| JP | 2006143151 | 6/2006 |
| JP | 3819261 B2 | 9/2006 |
| JP | 2006248250 A | 9/2006 |
| JP | 2007514602 A | 6/2007 |
| JP | 2009006985 | 1/2009 |
| JP | 2009051292 A | 3/2009 |
| JP | 2011051409 A | 3/2011 |
| KR | 2006083578 A | 7/2006 |
| WO | 2005097577 A1 | 10/2005 |
| WO | 2011148240 A1 | 12/2011 |
| WO | 2012066704 A1 | 5/2012 |
| WO | 2012176553 A1 | 12/2012 |

OTHER PUBLICATIONS

U.S. Appl. No. 13/299,407, filed Nov. 18, 2011, titled Road Wheel Disturbance Rejection.

Chinese Office Action issued Dec. 3, 2014 on Chinese Patent Application No. 201210586416.7.

Extended European Search Report issued Jan. 21, 2015 in EP Application. No. 14156987.1.

Ansgar Rehm, Vehicle Velocity Estimation by Dynamic Inversion of Wheel Force Generation; Control Conference (ECC), 2009 European Year: 2009; pp. 4798-4803.

D.I. Katzourakis, et al.; "Steering Force Feedback for Human-Machine-Interface Automotive Experiments"; IEEE Transactions on Instrumentation and Measurement, vol. 60, No. 1, pp. 32-43, Jan. 2011.

English Translation of Chinese Office Action for related CN Application No. 201210586416.7; Issued Aug. 12, 2015; 14 pages.

English Translation of CN Office Action & Search Report for related CN Application No. 201410086920.X; Issued Nov. 5, 2015; 10 pages.

English Translation of CN Office Action & Search Report for related CN Application No. 2014110331120.X; Issued Nov. 30, 2015; 9 pages.

EP Search Report for related EP Application No. 14166178.5; dated Aug. 22, 2014; 7 pages.

European Patent Application No. 14192466.2; office action dated Feb. 5, 2016; 7 pages.

Extended EP Search Report for related EP Application No. EP14192466.2; dated Apr. 9, 2015; 8 pages.

Extended EP Search report from related Application No. 15184544. 3-1755: Mail date: Mar. 16, 2014; 7 pages.

Extended European Search Report for related EP Application No. 15173865.5; dated Nov. 23, 2015; 10 pages.

Gillespie, T.D.; "Fundamentals of Vehicle Dynamics"; Warrendale, PA; Society of Automotive Engineers; 1992; ISBN 1560911999, 9781560911999; pp. 205-206.

Hsu, Yung-Hsiang Judy, "Estimation and Control of Lateral Tire Forces using Steering Torque"; Dissertation of Stanford University, Mar. 2009; 191 pages.

J.C.F. de Winter, et al.; "A Two-Dimensional Weighting Function for a Driver Assistance System"; IEEE Transactions on Systems, Man and Cybernetics B, Cybem., vol. 38, No. 1, pp. 189-198, Feb. 2008.

Katzourakis, D.I., et al.; "Road-Departure Prevention in an Emergency Obstacle Avoidance Situation"; IEEE Transactions on Systems, Man, and Cybernetics: Systems; vol. 44, Issue 5; vol. 44, No. 5, pp. 621-629.

(56) References Cited

OTHER PUBLICATIONS

Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.
Pornsarayouth, S., et al., Sensor Fusion of Delay and Non-delay Signal using Kalman Filter with Moving Covariance, Robotics and Biomimetics, 2008, ROBIO 2008, IEEE International Conference on: Year 2009; pp. 2045-2049, DOI: 10.1109/ROBIO.2009.4913316.
van der Jagt, Pim; "Prediction of Steering Efforts During Stationary or Slow Rolling Parking Maneuvers"; Ford Forschungszentrum Aachen GmbH.; Oct. 27, 1999; 20 pages.
Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.
Chinese Office Action for related Chinese Application No. CN201410086920.X, dated May 23, 2016, 8 pages.
English Translation of CN Chinese Office Action for related Chinese Application No. CN201410086920.X, dated May 23, 2016, 9 pages.

* cited by examiner

ROAD WHEEL DISTURBANCE REJECTION BASED ON HAND WHEEL ACCELERATION

BACKGROUND OF THE INVENTION

The present invention relates to a control system for a steering system, and more particularly to a control system for determining a rejection command based on hand wheel acceleration and road wheel frequency.

Vehicles are subjected to some degree of disturbance in the front road wheels. In one example, road wheel disturbance may be caused by variations in brake disk thickness, which is referred to as brake judder. The variation in brake disk thickness may create a harmonic modulation of a braking force during braking of the vehicle, which in turn may be transmitted to a steering column and a hand wheel of a steering system. The vibrations created in the hand wheel may be detected by a driver. Some approaches currently exist for reducing and rejecting road wheel disturbance. However, while they might be relatively effective at rejecting road wheel disturbance at higher vehicle speeds, these approaches may not be as effective if the vehicle is operating at relatively lower vehicle speeds. In other examples, road wheel disturbances may also be caused by imbalance, tire non-uniformity, or brake disk thermal effects.

SUMMARY OF THE INVENTION

In one embodiment, a control system for a steering system is provided, and includes an acceleration module, a scaling module, and a final command module. The acceleration module determines hand wheel acceleration. The scaling module determines a rejection command. The rejection command is based on the hand wheel acceleration and a road wheel frequency. The final command module determines an adjusted assist command that is based on a normal assist command and the rejection command.

In another embodiment, a method for determining a rejection command for a steering system is provided. The method includes determining hand wheel acceleration by an acceleration module. The method includes determining the rejection command by a scaling module. The rejection command is based on the hand wheel acceleration. The method includes sending an adjusted assist command that is based on a normal assist command and the rejection command to a motor by a final command module.

In yet another embodiment, a control system for a steering system is provided, and includes an acceleration module, a scaling module, and a final command module. The acceleration module determines hand wheel acceleration. The hand wheel acceleration is based on an extended state observer, and is determined based on a motor torque command, a hand wheel torque, a motor position, and a motor velocity. The scaling module determines a rejection command. The rejection command is based on the hand wheel acceleration and a road wheel frequency, and represents a road wheel disturbance cancel amount. The final command module determines an adjusted assist command that is based on a normal assist command and the rejection command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
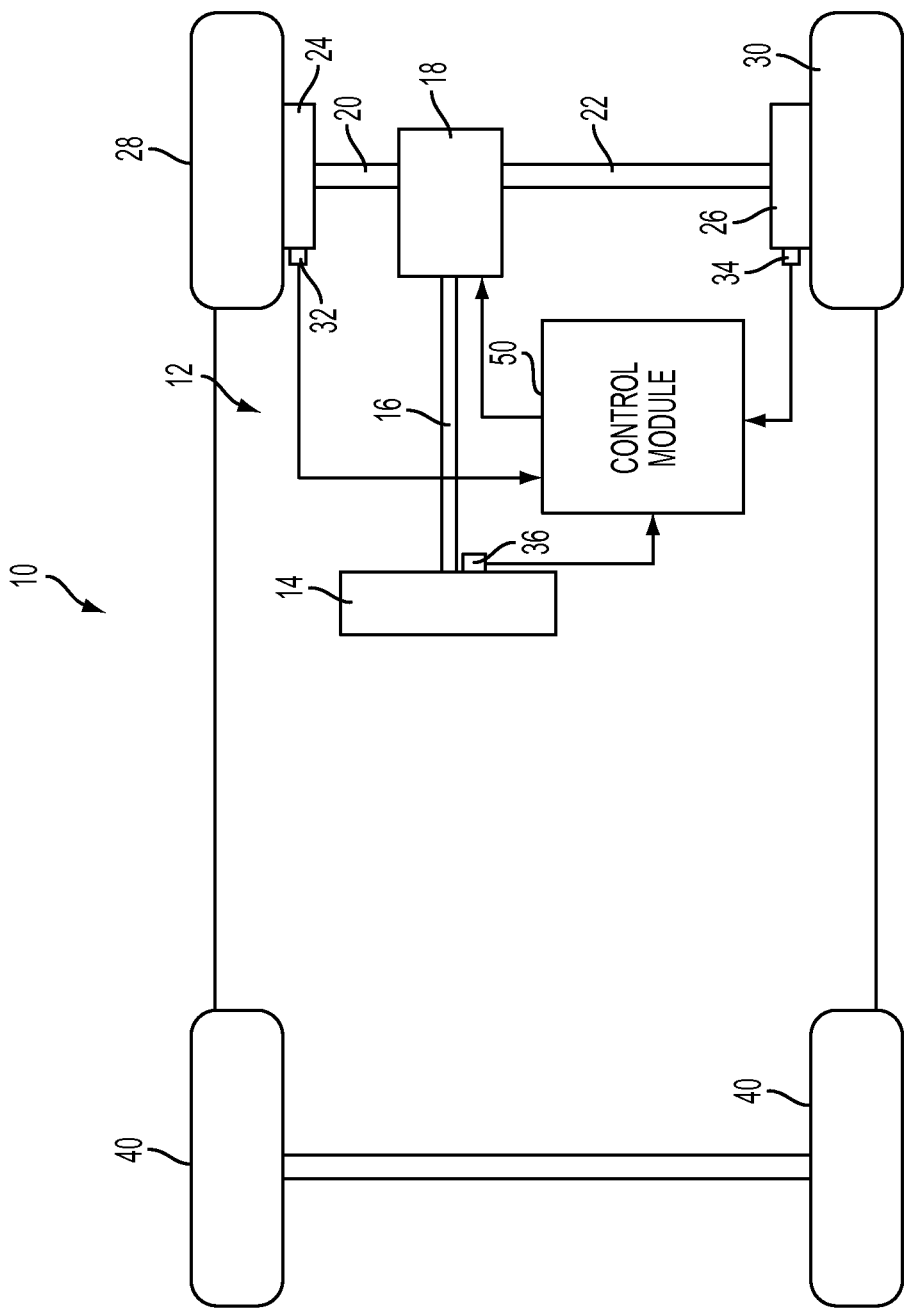
FIG. 1 is a function block diagram illustrating a vehicle including a steering system, in accordance with an exemplary embodiment of the invention.

Referring now to the Figures, where the invention will be described with reference to specific embodiments, without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the left tie rod 20 and the right tie rod 22 which in turn moves left and right steering knuckles 24, 26, respectively. The left knuckle 28 is coupled to a left roadway wheel 28, and the right knuckle 26 is coupled to a right roadway wheel 30 of the vehicle 10.

As shown in FIG. 1, the vehicle 10 further includes various sensors that detect and measure observable conditions of the steering system 12 and/or of the vehicle 10. The sensors generate sensor signals based on the observable conditions. In the example shown, a left wheel speed sensor 32 senses a rotational speed of the left wheel 28 and a right wheel speed sensor 34 senses a rotational speed of the right wheel 34. The left wheel speed sensor 32 and the right wheel speed sensor 34 generate wheel speed signals based thereon. In other examples, other wheel speed sensors (not shown) may be provided in addition to or alternative to the left wheel speed sensor 32 and the right wheel speed sensor 34. The other wheel speed sensors may sense a rotational speed of rear wheels 40 and generate sensor signals based thereon. For exemplary purposes, the disclosure will be discussed in the context of the left wheel speed sensor 32 and the right wheel speed sensor 34. As can be appreciated, other wheel sensors that sense wheel movement, such as wheel position sensors, may be used in place of the wheel speed sensors. In such a case, a wheel velocity may be calculated based on the wheel sensor signal. A torque sensor 36 is also provided for sensing a torque placed on the handwheel 14. In the exemplary embodiment as shown, the torque sensor 36 is placed on the hand wheel 14, however it is to be understood that the torque sensor 26 may not always be placed near or on the hand wheel 14.

Figure 2:
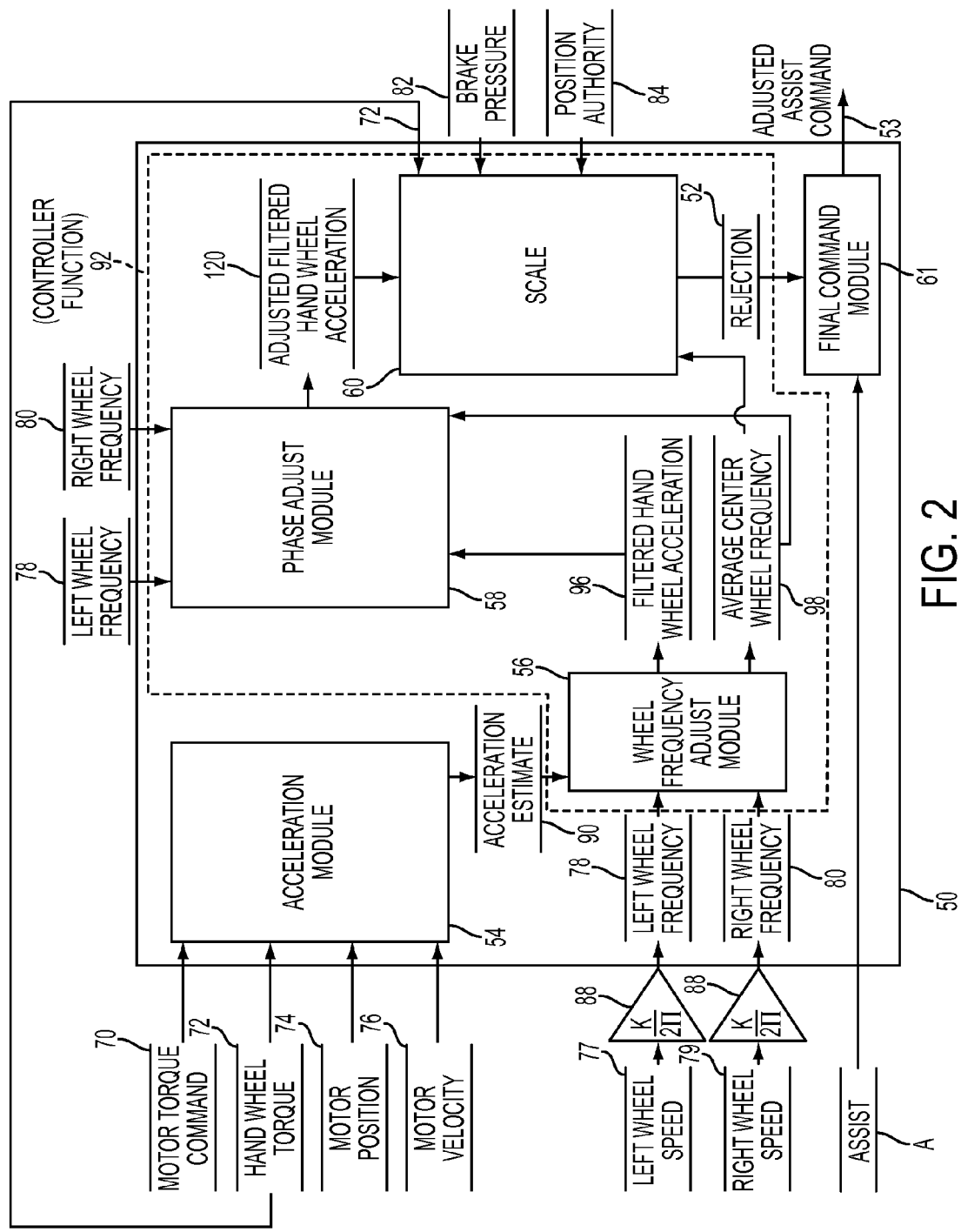
FIG. 2 is a dataflow diagram illustrating a control module shown in FIG. 1, in accordance with another exemplary embodiment of the invention.

A control module 50 controls the operation of the steering system 12 based on one or more of the sensor signals and further based on the steering control systems and methods of the present disclosure. Referring now to FIG. 2, a dataflow diagram illustrates an exemplary embodiment of the control module 50 of FIG. 1 used to control the steering system 12 of FIG. 1. In various embodiments, the control module 50 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the sub-modules shown in FIG. 2 may be combined or further partitioned. Inputs to the control module 50 may be generated from the sensors left wheel speed sensor 32, the right wheel speed sensor 34, and the torque sensor 36 (FIG. 1) of the vehicle 10 (FIG. 1) as well as various other sensors, may be received from other control modules (not shown) within the vehicle 10 (FIG. 1), may be modeled, or predefined. The steering assist unit 18 (FIG. 1) may also provide motor position and velocity signals.

The control module 50 determines a rejection command 52. The rejection command 52 represents a road wheel disturbance cancel amount based on the velocity of the road wheels (e.g., the left wheel 28 and the right wheel 30 shown in FIG. 1) and an acceleration of the hand wheel 14 (FIG. 1). The rejection command 52 may be added to a normal assist command A by a final command module 61 to determine an adjusted assist command 53 that is sent to a motor of the steering assist unit 18 shown in FIG. 1 (e.g., an EPS motor). The adjusted assist command 53 reduces hand wheel vibration due to periodic road wheel disturbances. In one example, periodic road wheel disturbance may be brake judder. In the exemplary embodiment as shown in FIG. 2, the control module 50 includes an acceleration module 54, a wheel frequency adjust module 56, a phase adjust module 58, a scale module 60, and the final command module 61.

In the exemplary embodiment as shown, the control module 50 receives as input a motor torque command 70, a hand wheel torque 72, a motor position 74, a motor velocity 76, a left wheel speed 77 that is converted into a left wheel frequency 78, a right wheel speed 79 that is converted into a right wheel frequency 80, brake pressure 82, and a position authority signal 84. The control module 50 (or another module) may convert the motor torque command 70 from motor coordinates into steering coordinates (e.g., motor Nm to hand wheel Nm) by scaling the motor torque command 70 by a motor-to-steering wheel ratio. In one embodiment, the motor torque command 70 may represent a final command sent to a motor of the steering assist unit 18 shown in FIG. 1 (e.g., the EPS motor). In another embodiment, the motor torque command 70 may be the assist command A, however it should be noted the assist command A is generally not the final command that is sent.

The hand wheel torque 72 is measured by the torque sensor 36 shown in FIG. 1. The motor position 74 may be determined by a motor position sensor (not shown in FIG. 1) for indicating the position of a motor of the steering assist unit 18 shown in FIG. 1. The motor position 74 may be converted from motor coordinates into steering coordinates (e.g., motor degrees into hand wheel degrees) by scaling the motor position 74 by the motor-to-steering wheel ratio. The motor position 74 may also be converted from degrees into radians. The motor velocity 76 may be measured using a motor velocity sensor (not shown in FIG. 1) for indicating the position of a motor of the steering assist unit 18 shown in FIG. 1. The motor velocity 76 (measured in radians/second) may be converted from motor coordinates into steering coordinates by scaling the motor velocity 76 by the motor-to-steering wheel ratio as well.

The left wheel frequency 78 may be determined based on the left wheel speed 77 and the right wheel frequency 80 may be determined based on the right wheel speed 79. The left wheel speed 77 is determined by the left wheel speed sensor 32 and the right wheel speed is determined by the right wheel speed sensor 34 shown in FIG. 1. For example, the control module 50 (or any other module) may determine the left wheel frequency 78 and the right wheel frequency 80 by scaling the respective wheel speed by a gain block 88 by: frequency=K/(2*π) (i.e., based on the relation: ω=2*π*frequency). In various embodiments, K is equal to one when the frequency is a first order disturbance, but may also take on other values, such as two, in the case of a second order disturbance. It should be noted that a first order brake disk thickness variation (DTV) results in a sinusoidal braking variation having a frequency that is the left wheel speed 77 or the right wheel speed 79 scaled by K/(2*π), where K=1. If a second order DTV is to be mitigated, then the left wheel speed 77 or the right wheel speed 79 is the scaled by K/(2*π), where K=2.

The brake pressure 82 may be determined, for example, by monitoring a vehicle controller area network (CAN) bus. The brake pressure 82 represents the braking pressure as applied by a driver. The position authority signal 84 is a unitless signal that varies from 0 to 1, and represents an amount of confidence that the motor position 74 at initialization is generally accurate.

The control module 50 generally performs two different functions, determining an acceleration estimation 90 of the hand wheel 14 (FIG. 1), and a controller function 92 (shown in phantom or dashed line). The acceleration estimation 90 is determined by the acceleration module 54, and represents the acceleration of the hand wheel 14 shown in FIG. 1. The rejection command 52 is determined by the controller function 92. The controller function 92 includes the wheel frequency adjust module 56, the phase adjust module 58, and the scale module 60.

In one exemplary embodiment, the acceleration module 54 may determine the acceleration estimation 90 using an extended state observer, which is described below. However, it is to be understood that other approaches may be used as well to determine the acceleration estimation 90. In one embodiment, acceleration of the hand wheel 14 (FIG. 1) may be determined by monitoring the vehicle CAN bus, or a direct vibration measurement using an accelerometer. In another approach, a hand wheel velocity could be determined, and the derivative of hand wheel velocity could be calculated to determine acceleration.

Figure 3:
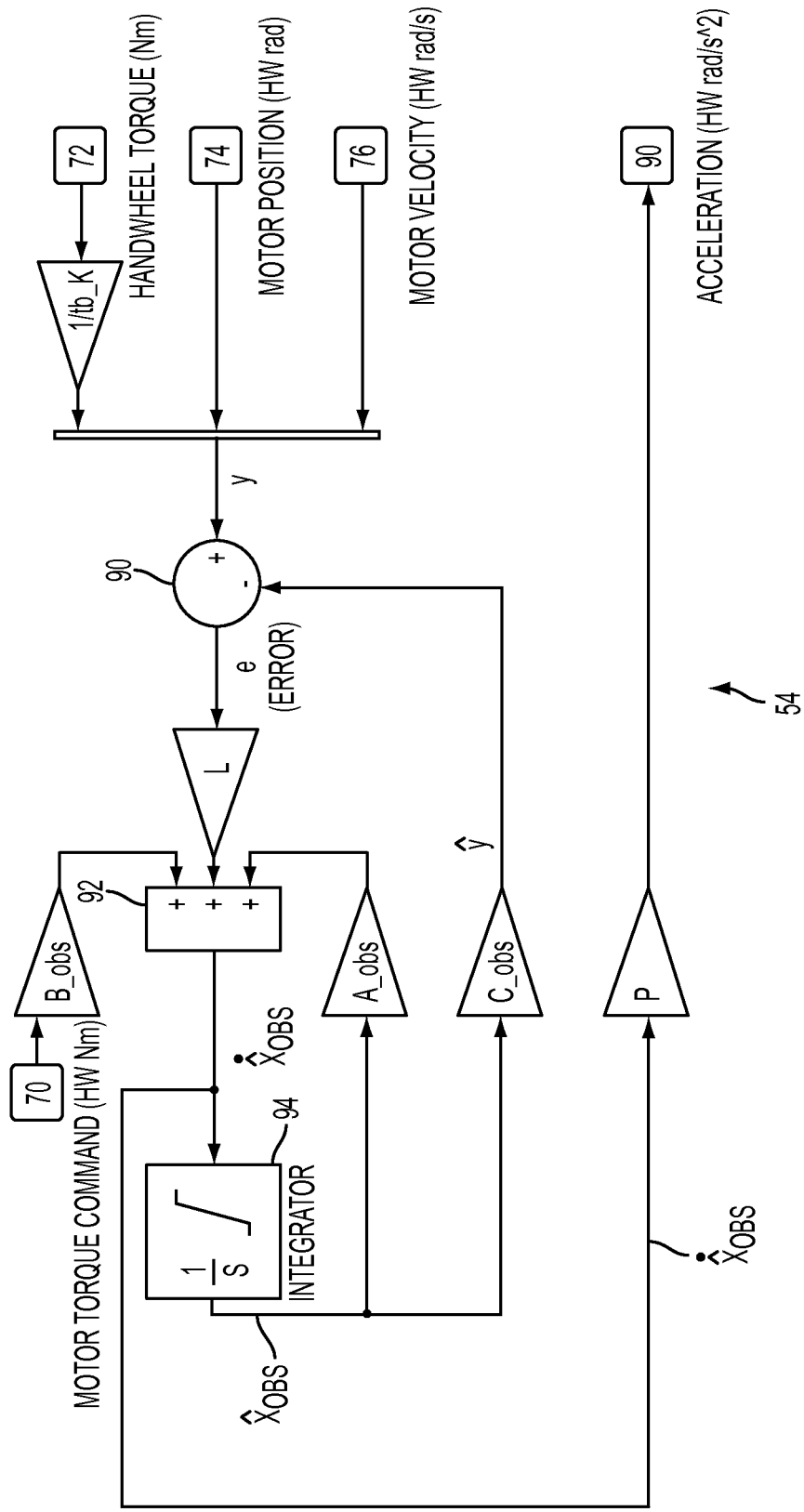
FIG. 3 is an exemplary approach for determining acceleration of a hand wheel shown in FIG. 1, in accordance with yet another exemplary embodiment of the invention.

FIG. 3 is one exemplary approach for determining the acceleration estimation 90, using the extended state observer. In the embodiment as shown in FIG. 3, the extended state observer is in the continuous domain. However it is to be understood that other implementations may be used as well such as, for example, the discrete domain. In the embodiment as discussed, the term extended state refers to the addition of unknown inputs to system states. In one approach, the system (e.g., the steering system 12) may contain between six to eight state variables, however it is understood any number of variables may be used as well. Some examples of state variables include, for example, position and velocity. The extended state observer may be expressed by equation 1 as:

$$\dot{x}_{obs} = A_{obs}\hat{x}_{obs} + B_{obs}u + L(y-\hat{y})$$ Equation 1 where the cap or hat symbol "^" is used to indicate an estimated signal (e.g., a calculated or predicted system output), and the subscript "obs" indicates observed. Specifically, $x_{obs}$ refers to a state of the steering system 12, and contains state variables that represent values inside the steering system 12. The term $\hat{x}_{obs}$ refers to a calculated state of the steering system 12. The term $\dot{\hat{x}}_{obs}$ represents the rate of change of the system state, or a state change (e.g., the differentiation of $\hat{x}_{obs}$). The term u refers to system input. The term y refers to system output. The term $A_{obs}$ refers to a system matrix, and determines how the current state (e.g., $\hat{x}_{obs}$) affects the state change $\dot{\hat{x}}_{obs}$. The term $B_{obs}$ represents a control matrix, and determines how the system input u affects the state change $\dot{\hat{x}}_{obs}$. L represents the observer gain matrix, and determines how an error e between a measured system output y and a calculated system output ŷ affects the state change $\dot{\hat{x}}_{obs}$. Finally, the term $C_{obs}$ (not expressed in equation 1) refers to an output matrix, and calculates system output ŷ using the calculated state $\hat{x}_{obs}$.

The acceleration module 54 receives as inputs the motor torque command 70, the hand wheel torque 72, the motor position 74, and the motor velocity 76. The acceleration module 54 assumes an accurate motor position 74 to correctly determine the acceleration estimation 90. The hand wheel torque 72 may be scaled by 1/tb_K to determine a t-bar angle, where tb_K represents a t-bar stiffness of the torque sensor 36 (FIG. 1). The hand wheel torque 72 (scaled by 1/tb_K), the motor position 74, and the motor velocity 76 together represent the measured system output y. The error e is determined by the junction 90, and is the difference between the measured system output y and the calculated system output ŷ. In the approach as shown, the calculated system output ŷ is determined by scaling the calculated state $\hat{x}_{obs}$ by the output matrix $C_{obs}$. The error e is scaled by the observer gain matrix L and is sent to a summation block 92. The summation block 92 corresponds to Equation 1.

The motor torque command 70 is scaled by the control matrix $B_{obs}$ and sent to the summation block 92, and the calculated state $\hat{x}_{obs}$ is sent to the summation block 92 as well. The error term, e, multiplied with the observer gain, L, is also sent to the summation block 92. The summation block 92 outputs the state change $\dot{\hat{x}}_{obs}$. The state change $\dot{\hat{x}}_{obs}$ is sent to an integrator 94. The integrator 94 provides an estimate of the states (i.e., the calculated state $\hat{x}_{obs}$). The state change $\dot{\hat{x}}_{obs}$ may be scaled by a vector value P in order to determine the acceleration estimation 90. The vector P is used to extract a rate of change of velocity (e.g., the acceleration) that is coming out of the summation block 92.

Figure 4:
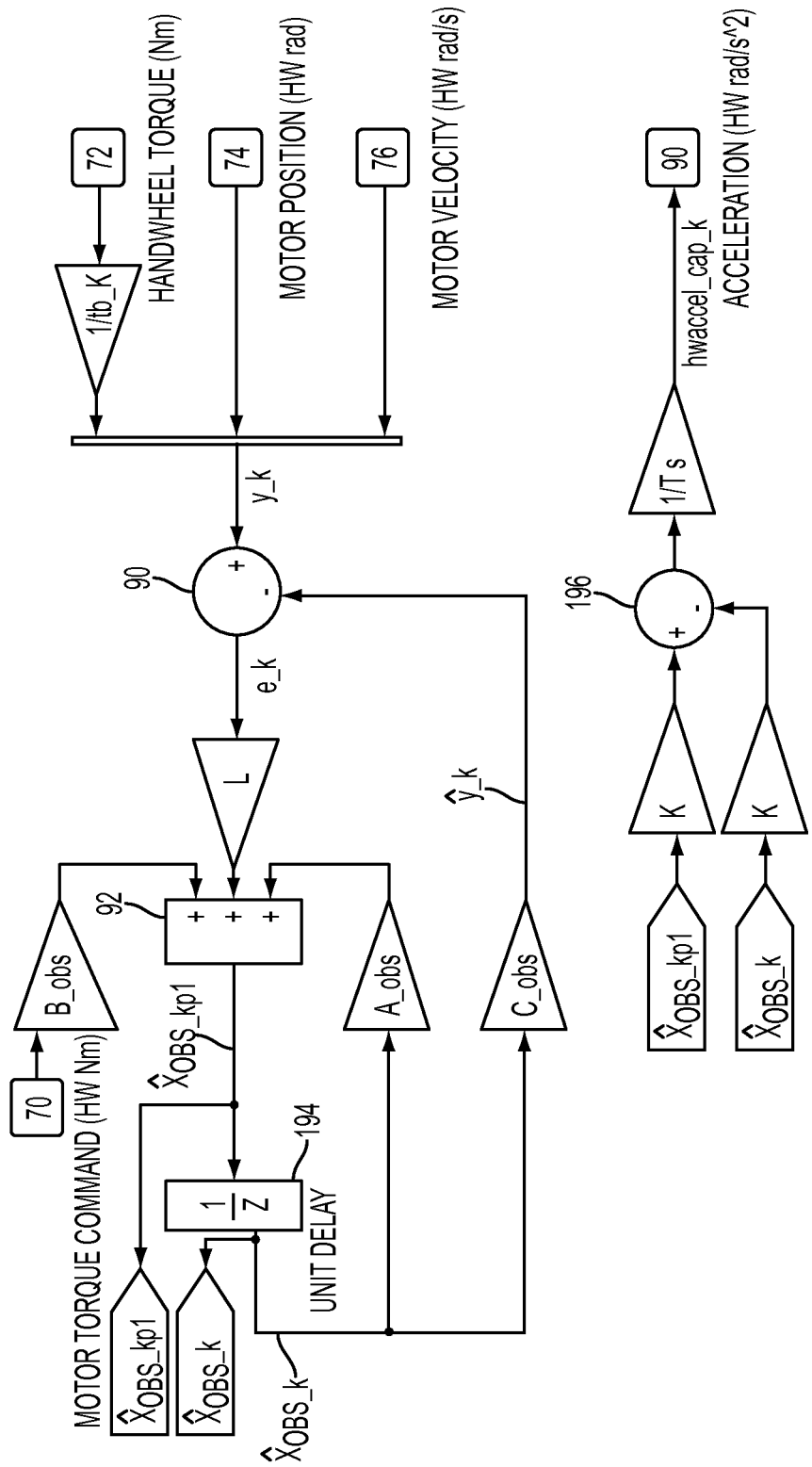
FIG. 4 is another exemplary approach for determining acceleration of a hand wheel shown in FIG. 1, in accordance with yet another exemplary embodiment of the invention.

FIG. 4 is an alternative approach for determining the acceleration estimation 90, using the extended state observer. In the embodiment as shown in FIG. 4, the extended state observer is in the discrete domain. The nomenclature is similar to the approach in FIG. 3, however the variable k indicates a sample number (e.g., k indicates the $k^{th}$ sample) and the variable K is a vector used to extract the acceleration estimation 90. The measured system output y is now annotated as measured system output y_k, which means the system output is determined at a $k^{th}$ sample. Likewise, e_k is the error at the $k^{th}$ sample, ŷ_k is the calculated system output at the $k^{th}$ sample, $\hat{x}_{obs}$_k refers to the calculated state at the $k^{th}$ sample, and $\hat{x}_{obs}$_kp1 refers to the calculated state at the sample k+1. A unit delay 194 is provided, where the unit delay determines the calculated state $\hat{x}_{obs}$_k based on the calculated state $\hat{x}_{obs}$_kp1. Both the calculated state $\hat{x}_{obs}$_k and the calculated state $\hat{x}_{obs}$_kp1 are scaled by the vector K, and a junction 196 is used to determine the difference between the calculated state $\hat{x}_{obs}$_k and the calculated state $\hat{x}_{obs}$_kp1. The difference is then divided by a sample time Ts to determine the acceleration estimation 90.

Referring back to FIG. 2, the acceleration estimation 90 is sent to the wheel frequency adjust module 56. The wheel frequency adjust module 56 also receives as input the left wheel frequency 78 and the right wheel frequency 80. The wheel frequency adjust module 56 determines a filtered hand wheel acceleration 96 and an average center wheel frequency 98.

Figure 5:
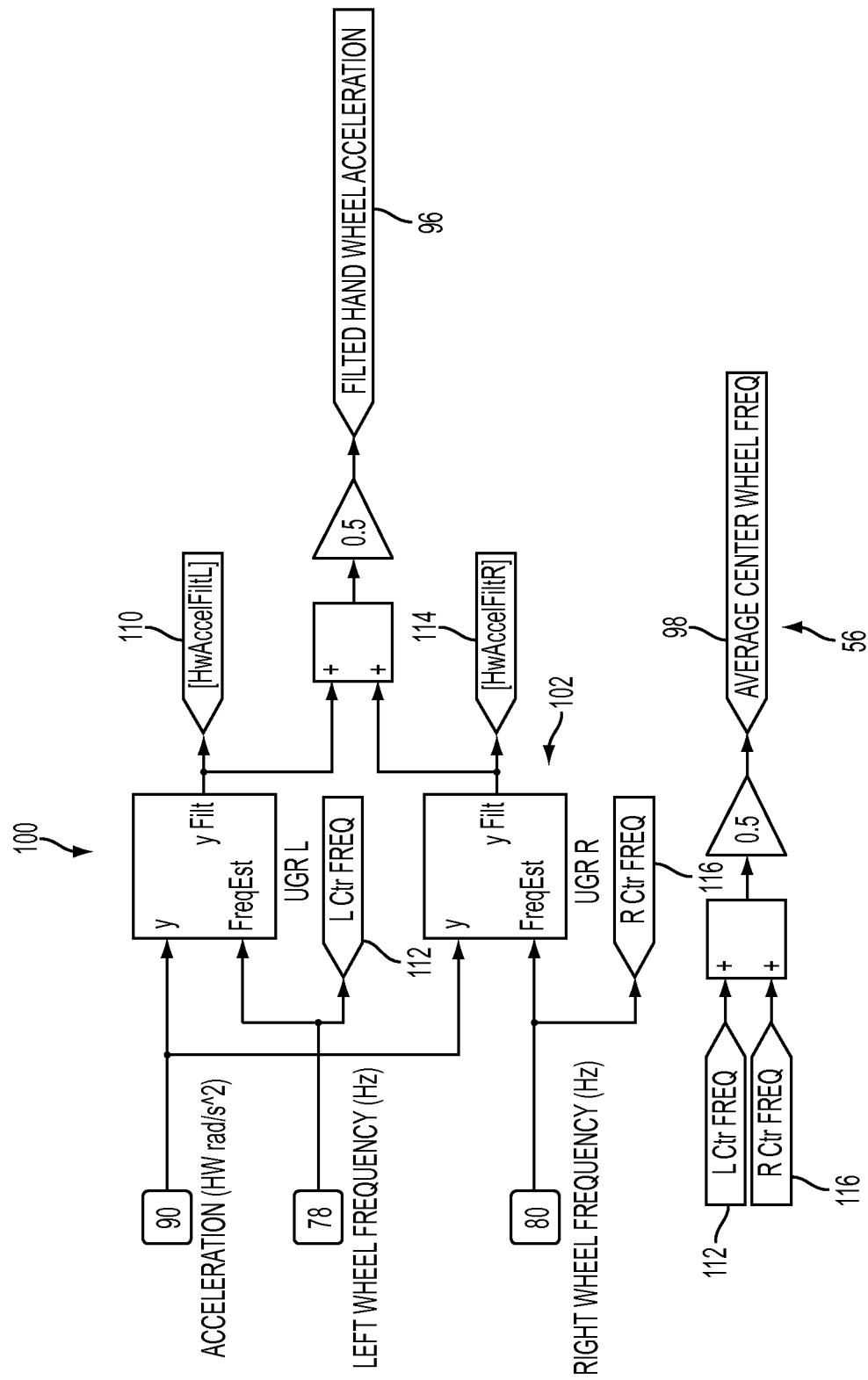
FIG. 5 is an exemplary approach for determining a filtered acceleration of the hand wheel, in accordance with another exemplary embodiment of the invention.

Referring now to FIG. 5, an exemplary illustration of the wheel frequency adjust module 56 is shown. The acceleration estimation is sent to a left narrowband filter 100 and a right narrowband filter 102. Specifically, the left narrowband filter 100 is a unity gain resonator (UGR) that receives as input the left wheel frequency 78 and the acceleration estimation 90, and determines a left filtered acceleration 110 and a left center frequency 112. The left filtered acceleration 110 is a bandpass filtered version of the acceleration estimation 90, and the left center frequency 112 represents a bandpass center frequency based on the left wheel frequency 78. The bandpass center frequency varies based on the left wheel frequency 78. The right narrowband filter 102 is a UGR that receives as input the right wheel frequency 80 and the acceleration estimation 90, and determines a right filtered acceleration 114 and a right center frequency 116. The right filtered acceleration 114 is a bandpass filtered version of the acceleration estimation 90, and the right center frequency 116 represents a bandpass center frequency based on the right wheel frequency 80. The bandpass center frequency varies based on the right wheel frequency 80. The left filtered acceleration 110 and the right filtered acceleration 114 are averaged together to determine the filtered hand wheel acceleration 96. The filtered hand wheel acceleration 96 is a narrowband signal that may be sinusoidal in the event of a brake disturbance. The left center frequency 112 and the right center frequency 116 are also averaged together to determine the average center wheel frequency 98.

Referring back to FIG. 2, the filtered hand wheel acceleration 96 and the average center wheel frequency 98 are sent to the phase adjust module 58. The phase adjust module 58 determines an adjusted filtered hand wheel acceleration 120. Specifically, the filtered hand wheel acceleration 96 is adjusted to compensate for system dynamics, and may be delayed or advanced by a specific number of degrees. The compensated filtered hand wheel acceleration 96 results in the adjusted filtered hand wheel acceleration 120.

The scale module 60 receives as input the adjusted filtered hand wheel acceleration 120 from the phase adjust module 58, the average center wheel frequency 98, the hand wheel torque 72, brake pressure 82, and the position authority signal 84. The scale module 60 requires the position authority signal 84 in order to correctly determine the rejection command 52. The scale module 60 uses a scale function to provide gain based on the average center wheel frequency 98, the hand wheel torque 72, and brake pressure 82. The scale module determines the rejection command 52.

Figure 6:
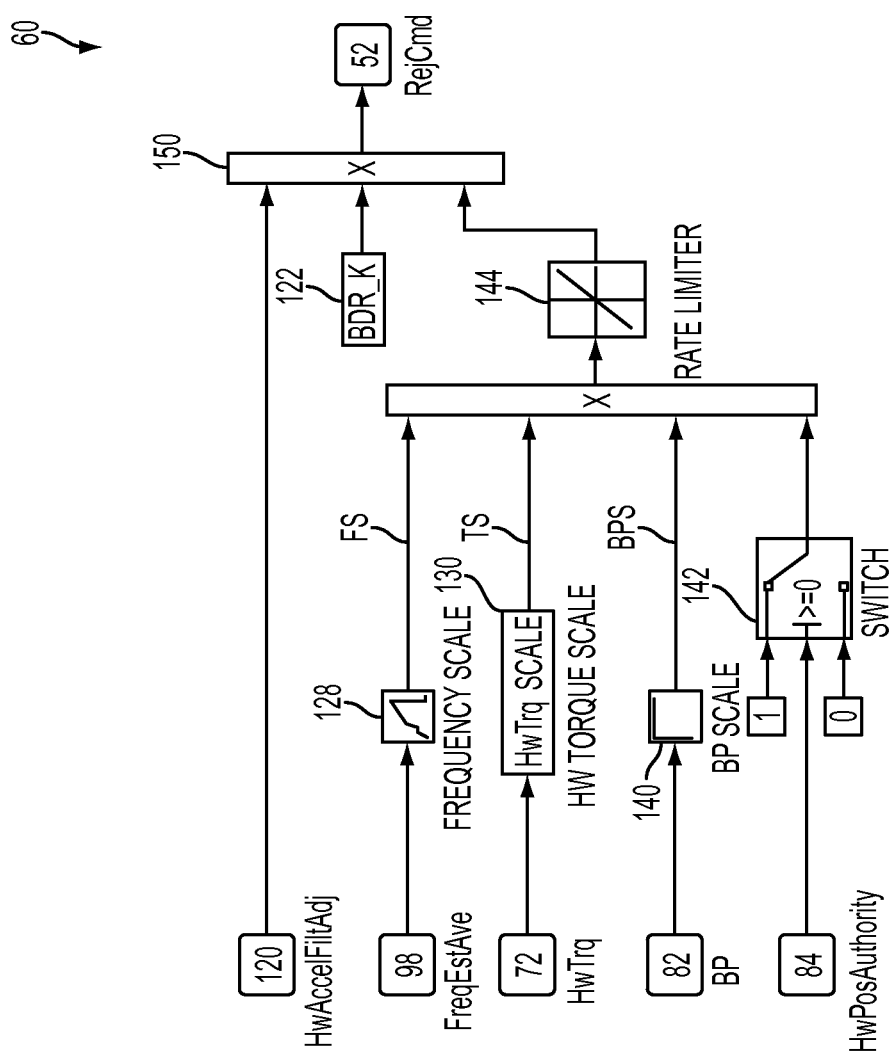
FIG. 6 is an exemplary approach for determining scale functions, in accordance with yet another exemplary embodiment of the invention.

FIG. 6 is an exemplary illustration of the scale module 60. The rejection command 52 is also based on a primary disturbance rejection gain 122 (BDR_K), which is subsequently scaled based on four other inputs (the average center wheel frequency 98, the hand wheel torque 72, brake pressure 82, and the position authority signal 84). Specifically, the average center wheel frequency 98 is sent to a frequency scale 128. In one embodiment, the frequency scale 128 is a lookup table that allows for scaling based on the average center wheel frequency 98, and determines a frequency scale output FS. Specifically, the frequency scale output FS allows for the rejection command 52 to be adjusted or enhanced at relatively low vehicle speeds within the constraints of the stability of the steering system 12. In one exemplary embodiment having first-order wheel disturbance, a low vehicle speed is about 35 to about 85 kilometers per hour. However, it is understood that this value may vary based on the specific system, the system stability, and the order of disturbance (e.g., second-order disturbances may include have higher values for vehicle speed). It should be noted that a final feedback gain (which is determined by multiplying the frequency scale output FS with primary disturbance rejection gain 122 in block 150) allows for the final feedback gain to be adjusted or enhanced at each operating frequency of the road wheels, resulting in a balance or tradeoff between wheel disturbance rejection and system stability.

Figure 7:
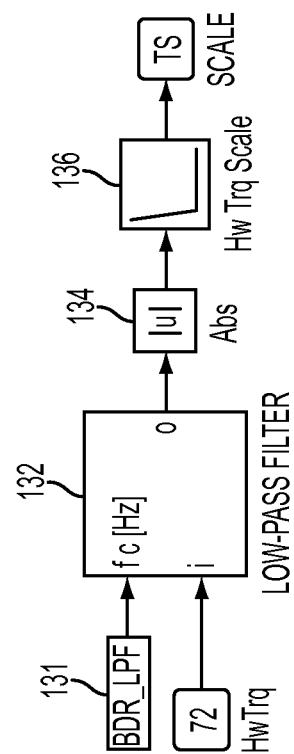
FIG. 7 is an exemplary approach of a hand wheel torque scale block shown in FIG. 6, in accordance with another exemplary embodiment of the invention.

The hand wheel torque 72 is sent to a hand wheel torque scale 130, which is shown in greater detail in FIG. 7. Turning now to FIG. 7, a filtered primary disturbance rejection gain 131 and the hand wheel torque 72 are sent to a filter 132 (e.g., a low-pass filter). Results of the filter 132 are then sent to a magnitude block 134, and the magnitude is sent to a hand wheel torque lookup table 136. The lookup hand wheel torque table 136 determines a torque scale output TS that is between 0 and 1. In particular, the hand wheel torque scale 130 allows for adjustment or enhancement of the rejection command 52 (FIG. 6) at relatively low levels of hand wheel torque, where brake disturbance may be the most pronounced. The hand wheel torque scale 130 may also disable the rejection command 52 (FIG. 6) at relatively higher levels of hand wheel torque. Relatively higher hand wheel torques may be experienced, for example, during a cornering maneuver of the vehicle 10 (FIG. 1). In one exemplary embodiment, relatively low hand wheel torque may be less than about 2 Nm.

Turning back to FIG. 6, the brake pressure 82 may be sent to a brake pressure scale 140, which determines a brake pressure scale BPS. The brake pressure scale BPS allows for brake pressure to be used as a condition for activation of the controller function 92 (i.e., to activate rejection command 52). The brake pressure scale BPS may be used to reduce wear of the steering system 12 (FIG. 1) by disabling the controller function 92 (FIG. 2) except during braking events. The controller function 92 may also be disabled to enhance driver feel. The position authority signal 84 is sent to a switch 142. The switch 142 allows for activation of the rejection command 52 once the motor position 74 at initialization is accurate. The frequency scale output FS, the torque scale output TS, and the brake pressure scale BPS, as well as the position authority signal 84 are then multiplied together and sent to a rate limiter 144. The output of the rate limiter 144 is then multiplied with the primary disturbance rejection gain 122 and the adjusted filtered hand wheel acceleration 120 in block 150 to determine rejection command 52.

Turning back to FIG. 2, the final command module 61 receives the rejection command 52 and the assist command A. The final command module 61 adds the rejection command to the assist command A to determine the adjusted assist command 53. The adjusted assist command 53 may be sent to a motor of the steering assist unit 18 shown in FIG. 1 (e.g., an EPS motor).

Referring now to FIGS. 1-7, the system as described above determines the rejection command 52 for reducing the amount of road wheel disturbance that is transmitted to the hand wheel 14 of the steering system 12. Specifically, the rejection command 52 is added to the assist command A to determine the adjusted assist command 53. The adjusted assist command 53 results in reduced hand wheel vibration due to periodic road wheel disturbances. Some approaches currently available for rejecting road wheel disturbance may be relatively effective at rejecting road wheel disturbance at higher vehicle speeds, but may not be as effective if the vehicle is operating at lower speeds. Furthermore, other approaches currently available for rejecting road wheel disturbance may require high resolution wheel speed sensors. The approach as discussed above does not generally require high resolution wheel sensors, which results in reduced cost and complexity. The approach as described above also provides for wheel disturbance rejection at relatively low vehicle speeds to be adjusted or enhanced within the constraints of the stability of the steering system 12. The approach as described above is configured to reduce hand wheel acceleration to provide improved road wheel disturbance rejection. The approach as discussed above also takes into account the braking pressure as applied by a driver. The braking pressure may be used to determine if the rejection command 52 is activated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a steering system, comprising:
an acceleration module for determining a hand wheel acceleration with an extended state observer that uses a hand wheel torque sensed by a torque sensor, a motor torque command of a motor of a steering assist unit, a motor position, and a motor velocity,
the extended state observer is expressed by:

$$\dot{\hat{x}}_{obs} = A_{obs}\hat{x}_{obs} + B_{obs}u + L(y - \hat{y})$$

wherein $\hat{x}_{obs}$ refers to a calculated state of the steering system, $\dot{\hat{x}}_{obs}$ represents a state change, u is system input, y is system output, $A_{obs}$ is a system matrix, $B_{obs}$ is a control matrix, L is an observer gain matrix, and $\hat{y}$ is a calculated system output;
a scaling module for determining a rejection command, the rejection command based on a gain of the hand wheel acceleration and a road wheel frequency, wherein the scaling module includes a brake pressure scale that activates the rejection command based on a brake pressure; and a final command module for determining an adjusted assist command used by a motor of a steering assist unit, the adjusted assist command is based on a normal assist command and the rejection command, the normal assist command is a motor torque command.

2. The control system of claim 1, wherein the scaling module receives as input an average center wheel frequency determined by a wheel frequency adjust module.

3. The control system of claim 2, wherein the scaling module includes a frequency scale for determining a frequency scale output based on the average center wheel frequency, and wherein the frequency scale output adjusts the rejection command based on vehicle speed.

4. The control system of claim 1, wherein a wheel frequency module determines a bandpass filtered version of the hand wheel acceleration, and wherein the bandpass filtered version of the hand wheel acceleration is provided to the scaling module.

5. The control system of claim 1, wherein the scaling module determines a torque scale output based on a hand wheel torque, and wherein the torque scale output is configured to adjust the rejection command based on a level of hand wheel torque.

6. The control system of claim 1, wherein the scaling module determines a torque scale output based on a hand wheel torque, and wherein the torque scale output is configured to disable the rejection command based on a level of hand wheel torque.

7. The control system of claim 1, comprising a phase adjust module for adjusting the hand wheel acceleration based on system dynamics of the steering system.

8. A method for determining a rejection command for a steering system, comprising:

determining a hand wheel acceleration by an acceleration module with an extended state observer that uses a motor torque command sent to a motor of a steering assist unit, a hand wheel torque, a motor position, and a motor velocity, the extended state observer is expressed by:

$$\dot{\hat{x}}_{obs} = A_{obs}\hat{x}_{obs} + B_{obs}u + L(y-\hat{y})$$

$\hat{x}_{obs}$ refers to a calculated state of the steering system, $\dot{\hat{x}}_{obs}$ represents a state change, u is system input, y is system output, $A_{obs}$ is a system matrix, $B_{obs}$ is a control matrix, L is observer gain matrix, and $\hat{y}$ is a calculated system output;

determining the rejection command by a scaling module, the rejection command based on a gain of the hand wheel acceleration; and determining an adjusted assist command that is based on a normal assist command and the rejection command to a motor by a final command module, the normal assist command is a motor torque command.

9. The method of claim 8, further comprising activating the rejection command based on a brake pressure by a brake pressure scale of the scaling module.

10. The method of claim 8, wherein the scaling module receives as input an average center wheel frequency determined by a wheel frequency adjust module.

11. The method of claim 10, wherein the scaling module includes a frequency scale for determining a frequency scale output based on the average center wheel frequency, and wherein the frequency scale output adjusts the rejection command based on vehicle speed.

12. The method of claim 8, further comprising determining a torque scale output based on a hand wheel torque by the scaling module, wherein the torque scale output is configured to adjust the rejection command based on a level of hand wheel torque.

13. The method of claim 8, further comprising determining a torque scale output based on a hand wheel torque by the scaling module, wherein the torque scale output is configured to disable the rejection command based on a level of hand wheel torque.

14. The method of claim 8, further comprising adjusting the hand wheel acceleration based on system dynamics of the steering system by a phase adjust module.

15. The method of claim 8, wherein a wheel frequency module determines a bandpass filtered version of the hand wheel acceleration, and wherein the bandpass filtered version of the hand wheel acceleration is provided to the scaling module.

* * * * *